(12) United States Patent
Li et al.

(10) Patent No.: US 12,518,735 B2
(45) Date of Patent: Jan. 6, 2026

(54) STREAMING, LIGHTWEIGHT AND HIGH-QUALITY DEVICE NEURAL TTS SYSTEM

(71) Applicant: MICROSOFT TECHNOLOGY LICENSING, LLC, Redmond, WA (US)

(72) Inventors: Jinzhu Li, Beijing (CN); Sheng Zhao, Beijing (CN); Guangyu Wu, Beijing (CN); Yulin Li, Beijing (CN); Yanqing Liu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 18/032,146

(22) PCT Filed: Jan. 18, 2022

(86) PCT No.: PCT/CN2022/072463
§ 371 (c)(1),
(2) Date: Apr. 14, 2023

(87) PCT Pub. No.: WO2023/137577
PCT Pub. Date: Jul. 27, 2023

(65) Prior Publication Data
US 2024/0371356 A1 Nov. 7, 2024

(51) Int. Cl.
*G06N 3/045* (2023.01)
*G06N 3/0442* (2023.01)
(Continued)

(52) U.S. Cl.
CPC ............ *G10L 13/02* (2013.01); *G06N 3/0442* (2023.01); *G06N 3/045* (2023.01); *G06N 3/0464* (2023.01); *G10L 13/08* (2013.01)

(58) Field of Classification Search
CPC ....... G10L 13/02; G10L 13/08; G10L 13/047; G10L 25/30; G06N 3/0442; G06N 3/045;
(Continued)

(56) References Cited

U.S. PATENT DOCUMENTS

2023/0298564 A1* 9/2023 Fang ..................... G10L 13/047
704/260

OTHER PUBLICATIONS

Jiang et al, Parallelized Convolutional Recurrent Neural Network with Spectral Features for Speech Emotion Recognition, Jul. 9, 2019, IEEE Access, vol. 7, 2019, pp. 90365-90377 (Year: 2019).*

(Continued)

*Primary Examiner* — Linda Wong
(74) *Attorney, Agent, or Firm* — Workman Nydegger

(57) ABSTRACT

Systems and methods are provided for generating a lightweight, high-quality streaming text-to-speech (TTS) system. For example, some disclosed systems are configured to obtain a first model comprising one or more layers of a convolutional neural network. Each layer of the convolutional neural network is configured to generate a new output from a previous input. The systems also obtain a second model comprising a recurrent neural network. Subsequent to obtaining the first model and the second model, the systems are configured to compile the one or more layers of the convolutional neural network and the recurrent neural network in a parallel architecture to generate a machine learning module such that each model of the machine learning module is configured to receive input simultaneously.

18 Claims, 8 Drawing Sheets

(51) Int. Cl.
*G06N 3/0464* (2023.01)
*G10L 13/02* (2013.01)
*G10L 13/08* (2013.01)

(58) Field of Classification Search
CPC .... G06N 3/0464; G06N 3/0455; G06N 3/084; G06N 3/105
See application file for complete search history.

(56) References Cited

OTHER PUBLICATIONS

Zhang et al, EEG-based Intention Recognition Recognition from Spatio-Temporal Representations via Cascade and Parallel Convolutional Recurrent Neural Networks, researchgate.net, Aug. 22, 2017 (Year: 2017).*

Achanta, et al., "On-Device Neural Speech Synthesis", In IEEE Automatic Speech Recognition and Understanding Workshop, Dec. 13, 2021, 7 Pages.

Beliaev, et al., "TalkNet 2: Non-Autoregressive Depth-Wise Separable Convolutional Model for Speech Synthesis with Explicit Pitch and Duration Prediction", In Repository of arXiv code: 2104.08189v3, Jun. 17, 2021, 5 Pages.

Huang, et al., "Devicetts: A Small-Footprint, Fast, Stable Network for On-Device Text-To-Speech", In Repository of arXiv:2010.15311v2, Jan. 15, 2021, 5 Pages.

Okamoto, et al., "Tacotron-Based Acoustic Model Using Phoneme Alignment for Practical Neural Text-to-Speech Systems", In Proceedings of IEEE Automatic Speech Recognition and Understanding Workshop, Dec. 14, 2019, pp. 214-221.

"International Search Report and Written Opinion Issued in PCT Application No. PCT/CN22/072463", Mailed Date: Jul. 27, 2022, 13 Pages. (MS# 410936-WO-PCT).

Shen, et al., "Natural TTS Synthesis by Conditioning WaveNet on Mel Spectrogram Predictions", In Repository of arXiv:1712.05884v2, Feb. 16, 2018, 5 Pages.

Vaswani, et al., "Attention Is All You Need", In Repository of arXiv:1706.03762v5, Dec. 6, 2017, 15 Pages.

* cited by examiner

STREAMING, LIGHTWEIGHT AND HIGH-QUALITY DEVICE NEURAL TTS SYSTEM

BACKGROUND

Automatic speech recognition systems and other speech processing systems are used to process and decode audio data to detect speech utterances (e.g., words, phrases, and/or sentences). The processed audio data is then used in various downstream tasks such as search-based queries, speech to text transcription, language translation, etc. In contrast, text-to-speech (TTS) systems are used to detect text-based utterances and subsequently generate simulated spoken language utterances that correspond to the detected text-based utterances.

In most TTS systems, raw text is tokenized into words and/or phonetic units. Each word or phonetic unit is then associated with a particular phonetic transcription and prosodic unit, which forms a linguistic representation of the text. The phonetic transcription contains information about how to pronounce to the phonetic unit, while the prosodic unit contains information about larger units of speech, including intonation, stress, rhythm, timbre, speaking rate, etc. Once the linguistic representation is generated, a synthesizer or vocoder is able to transform the linguistic representation into synthesized speech which is audible and recognizable to the human ear.

Conventional TTS systems rely on a sequential network of machine learning model layers. Unfortunately, such sequentially-based designs can detrimentally extend the TTS processing pipeline and will, therefore, have a correspondingly negative impact on the overall temporal and computational costs associated with TTS processing. Some of the negative effects associated with conventional and sequentially ordered TTS processing includes increased latency from the time text input is received and the time that the speech output is generated and rendered. Some TTS systems are configured with fewer processing layers, to effectively reduce the overall processing time. However, by omitting the processing layers, these known systems experience a degradation in the overall quality of the synthesized speech.

In view of the foregoing, there is an ongoing need for improved systems and methods for building and using low-latency, high-quality TTS systems to generate synthesized speech from text-based input.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Disclosed embodiments include systems, methods and devices for performing TTS processing and for generating and utilizing machine learning modules that are configured as parallel convolutional recurrent neural networks for facilitating the generation of synthesized speech from text-based input.

Some disclosed systems are configured to obtain a first model comprising one or more layers of a convolutional neural network, as well as a second model comprising a recurrent neural network. Subsequent to obtaining the first model and the second model, the systems generate a new machine learning module by compiling the one or more layers of the convolutional neural network with the recurrent neural network in a parallel architecture, and such that both of the first and second models of the new machine learning module are configured to receive input simultaneously.

Disclosed systems are also configured for generating an acoustic model configured to output a Mel spectrum based on text data. For example, these systems obtain an encoder comprising one or more parallel convolutional recurrent neural networks, the encoder being configured to encode text data with a set of acoustic features. The systems also obtain a duration predictor and a decoder, each comprising at least one parallel convolutional recurrent neural network. The duration predictor is configured to predict a duration of time for each acoustic feature. The decoder is configured to decode the set of acoustic features based on the duration of time associated with each acoustic feature in order to generate output for a Mel spectrum. The Mel spectrum is based on the initial input comprising text data received at the encoder.

In such systems, each parallel convolutional recurrent neural network included in the encoder, duration predictor, and decoder comprises one or more layers of a convolutional neural network and a recurrent neural network that are compiled into a parallel architecture. Subsequent to obtaining the encoder, the duration predictor, and decoder, the systems are configured to compile the encoder, the duration predictor, and decoder in sequence to generate an acoustic model.

Disclosed systems are also configured to generate a Mel spectrum output based on input text data. The systems obtain an acoustic model comprising an encoder, duration predictor, and decoder. Each of the encoder, duration predictor, and decoder further comprise one or more parallel convolutional recurrent neural network modules. Each parallel convolutional recurrent neural network module further comprise at least one or more layers of a convolutional neural network and a recurrent neural network compiled in a parallel architecture, such that the parallel convolutional recurrent neural network is configured to generate a combined output based on a first output from the one or more layers of the convolutional neural network and a second output from the recurrent neural network received in parallel.

Subsequent to obtaining the acoustic model, the systems apply a set of text data as initial input to the encoder of the acoustic model. After applying the set of text data, the systems generate a set of encoded features as output from the encoder based on the set of text data. The set of encoded features is then applied as input to the duration predictor, wherein the systems generate a set of predicted durations. Each predicted duration corresponds to an encoded feature included in the set of encoded features. The systems then apply the set of encoded features and the set of predicted durations to the decoder. Finally, the systems generate a Mel spectrum output based on the set of encoded features and the set of predicted durations, such that the Mel spectrum output reflects acoustic and linguistic features associated with the set of text data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be limiting in scope, embodiments will be described and explained with additional specificity and detail through the use of the accompanying drawings in which.

DETAILED DESCRIPTION

Disclosed embodiments are directed towards improved systems, methods, and frameworks for generating and utilizing machine learning modules that are configured as parallel convolutional recurrent neural networks. The disclosed embodiments also include systems and methods for generating acoustic models that use one or more of the disclosed parallel convolutional recurrent neural networks. In this regard, it will be appreciated that some of the disclosed embodiments are specifically directed to improved systems and methods for generating Mel spectrum output from text-based input using the models and modules disclosed herein.

The disclosed embodiments provide many technical advantages over existing systems, including the generation and utilization of a lightweight and high-quality TTS system architectures that perform parallel processing to reduce latency, as compared to conventional systems that do not perform parallel processing, and without sacrificing quality that is sometimes sacrificed by conventional systems that omit processing layers to reduce latency.

By combining the disclosed convolutional neural networks and recurrent neural networks into a parallel network structure, the disclosed embodiments are able to utilize parallel sub-networks of in a TTS system to configure new TTS systems with different types of models, different sizes of models, and different combinations of models without increasing the overall feature channel size or network (i.e., pipeline) depth of the TTS systems.

The parallel network architecture disclosed herein is very efficient and allows for generating high-quality acoustic models that have a small size and small inference cost. The parallel network architecture also provides a shorter overall processing pipeline, which can significantly reduce backpropagation during training. This reduction of the backpropagation makes training of the machine learning module (i.e., ParConvRNN) more efficient and produces modules having higher accuracy, by lowering training loss, especially during subsequent training of the acoustic model which employs one or more machine learning modules, as described herein.

Figure 1:
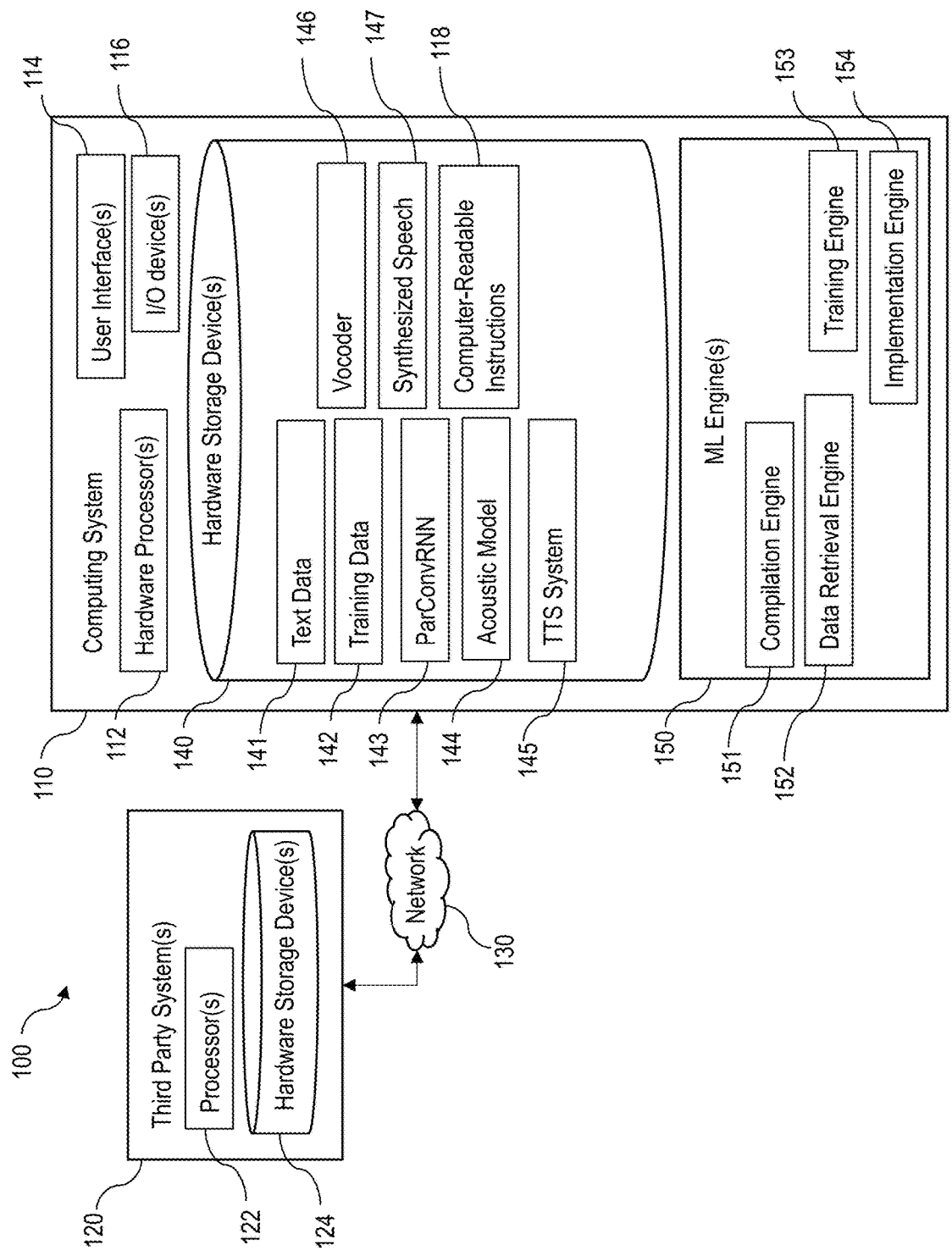
FIG. 1 illustrates a computing environment in which a computing system incorporates and/or is utilized to perform disclosed aspects of the disclosed embodiments.

Attention will now be directed to FIG. 1, which illustrates components of a computing system 110 which may include and/or be used to implement aspects of the disclosed invention. As shown, the computing system includes a plurality of machine learning (ML) engines, models, neural networks, and data types associated with inputs and outputs of the machine learning engines and models.

Attention will be first directed to FIG. 1, which illustrates the computing system 110 as part of a computing environment 100 that also includes third-party system(s) 120 in communication (via a network 130) with the computing system 110. The computing system 110 is configured to generate a machine learning module configured as a parallel convolutional recurrent neural network that is usable in various locations of a TTS system. The computing system 110 is also configured to generate an acoustic model which utilizes one or more parallel convolutional recurrent neural networks. Additionally, the computing system 110 is configured to generate a Mel spectrum.

The computing system 110, for example, includes one or more processor(s) (such as one or more hardware processor(s)) 112 and a storage (i.e., hardware storage device(s) 140) storing computer-readable instructions 118 wherein one or more of the hardware storage device(s) 140 is able to house any number of data types and any number of computer-readable instructions 118 by which the computing system 110 is configured to implement one or more aspects of the disclosed embodiments when the computer-readable instructions 118 are executed by the one or more processor(s) 112. The computing system 110 is also shown including user interface(s) 114 and input/output (I/O) device(s) 116.

As shown in FIG. 1, hardware storage device(s) 140 is shown as a single storage unit. However, it will be appreciated that the hardware storage device(s) 140 is, a distributed storage that is distributed to several separate and sometimes remote systems and/or third-party system(s) 120. The computing system 110 can also comprise a distributed system with one or more of the components of computing system 110 being maintained/run by different discrete systems that are remote from each other and that each perform different tasks. In some instances, a plurality of distributed systems performs similar and/or shared tasks for implementing the disclosed functionality, such as in a distributed cloud environment.

Figure 2:
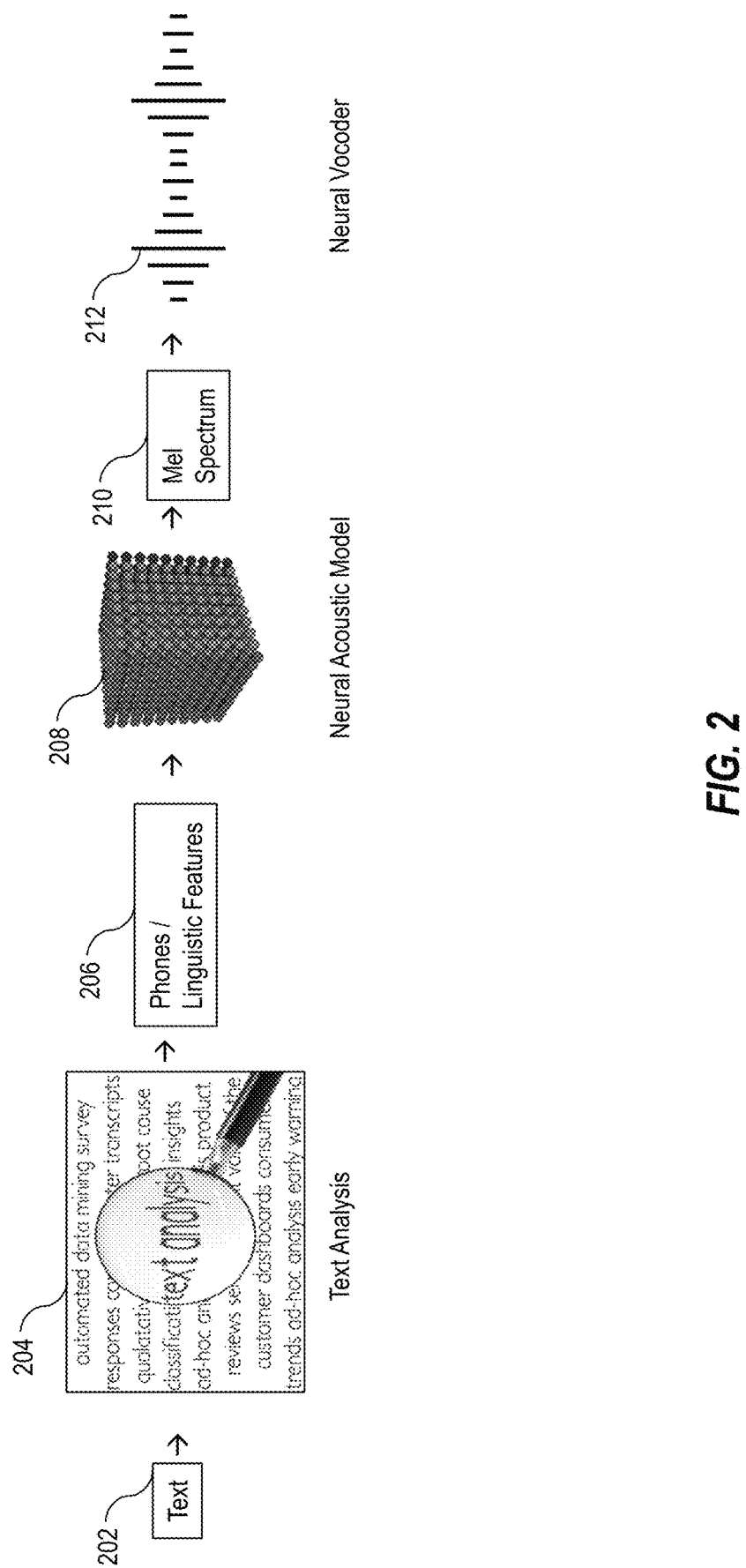
FIG. 2 illustrates an example embodiment of a process flow diagram for generating synthesized speech.
Figure 3:
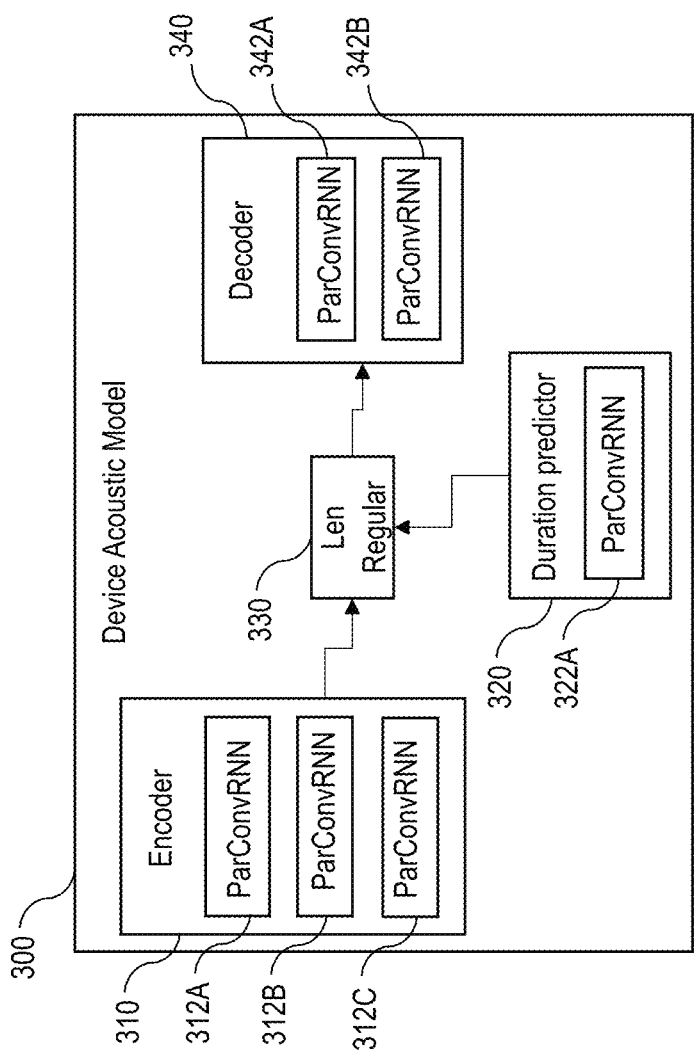
FIG. 3 illustrates an example embodiment of an acoustic model utilizing one or more parallel convolutional recurrent neural networks.
Figure 4:
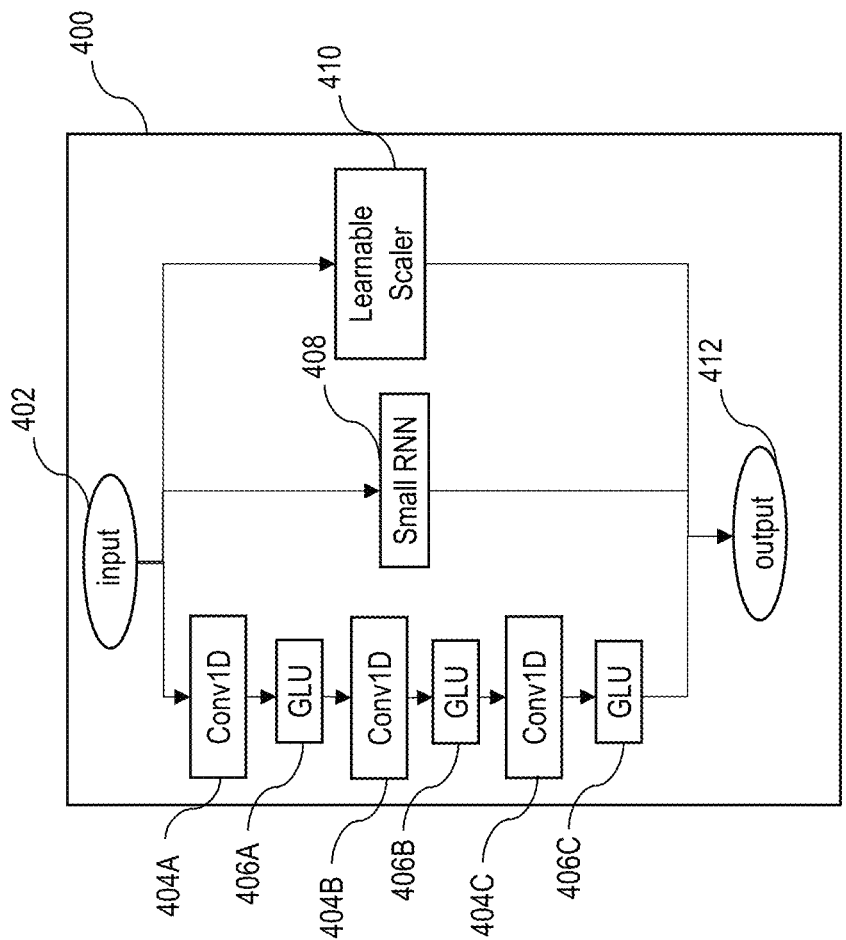
FIG. 4 illustrates an example embodiment of a parallel convolutional recurrent neural network, for example a parallel convolutional recurrent neural network as shown in FIG. 3.

The storage (e.g., hardware storage device(s) 140) includes computer-readable instructions 118 for instantiating or executing one or more of the models and/or engines shown in computing system 110 (e.g., TTS system 145—see FIG. 2, acoustic model 144—see FIG. 3, ParConvRNN 143—see FIG. 4, and/or vocoder 146). The models are configured as machine learning models or machine learned models, such as deep learning models and/or algorithms and/or neural networks. In some instances, the one or more models are configured as engines or processing systems (e.g., computing systems integrated within computing system 110), wherein each engine comprises one or more processors (e.g., hardware processor(s) 112) and computer-readable instructions 118 corresponding to the computing system 110. In some configurations, a model is a set of numerical weights embedded in a data structure, and an engine is a separate piece of code that, when executed, is configured to load the model, and compute the output of the model in context of the input audio.

The hardware storage device(s) 140 are configured to store and/or cache in a memory store the different data types including text data 141, training data 142, and synthesized speech 147, described herein.

The text data 141 comprises sequences of characters, symbols, and/or number extracted from a variety of sources. For example, the text data 141 comprises text message data, contents from emails, newspaper articles, webpages, books, mobile application pages, etc. In some instances, the characters of the text data 141 are recognized using optical text recognition of a physical or digital sample of text data 141. Additionally, or alternatively, the characters of the text data 141 are recognized by processing metadata of a digital sample of text data 141. The text data 141 is configured to processed by the TTS system 145 in order to generate synthesized speech 147.

The training data 142 comprises text data and natural language audio and simulated audio that comprises speech utterances corresponding to words, phrases, and sentences included in the text data. In other words, the speech utterances are the ground truth output for the text data input. The natural language audio is obtained from a plurality of locations and applications. In some instances, natural language audio is extracted from previously recorded files such as video recordings having audio or audio-only recordings. Some examples of recordings include videos, podcasts, voicemails, voice memos, songs, etc. Natural language audio is also extracted from actively streaming content which is live continuous speech such as a news broadcast, phone call, virtual or in-person meeting, etc. In some instances, a previously recorded audio file is streamed. Natural audio data comprises spoken language utterances without a corresponding clean speech reference signal. Natural audio data is recorded from a plurality of sources, including applications, meetings comprising one or more speakers, ambient environments including background noise and human speakers, etc. It should be appreciated that the natural language audio comprises one or more spoken languages of the world's spoken languages. Thus, the TTS system 145 is trainable in one or more languages.

Simulated audio data comprises a mixture of simulated clean speech (e.g., clean reference audio data) and one or more of: room impulse responses, isotropic noise, or ambient or transient noise for any particular actual or simulated environment or one that is extracted using text-to-speech technologies. Thus, parallel clean audio data and noisy audio data is generated using the clean reference audio data on the one hand, and a mixture of the clean reference audio data and background noise data. Simulated noisy speech data is also generated by distorting the clean reference audio data. In this manner, the TTS system 145 is trained on ground truth from natural audio data and on ground truth from simulated audio data.

The synthesized speech 147 comprises synthesized audio data comprising speech utterances corresponding to words, phrases, and sentences recognized in the text data 141. The synthesized speech 147 is generated based on a Mel spectrum that is output by the acoustic model 144 and applied as input to the vocoder 146. The synthesized speech 147 comprises speech utterances in different speaker voices, different languages, different speaking styles, etc. The synthesized speech 147 comprises speech utterances that are characterized by the encoded features (e.g., acoustic features and linguistic features) output by the encoder of the acoustic model 144. The synthesized speech 147 is also characterized and/or customizable based on the vocoder 146 used to process the Mel spectrum and generate the audio file (i.e., synthesized speech). In some instances, the synthesized speech 147 is beneficially generated to mimic natural language audio.

An additional storage unit for storing machine learning (ML) Engine(s) 150 is presently shown in FIG. 1 as storing a plurality of machine learning models and/or engines. For example, computing system 110 comprises one or more of the following: a compilation engine 151, a data retrieval engine 152, a training engine 153, and an implementation engine 154, which are individually and/or collectively configured to implement the different functionality described herein.

The compilation engine 151 is configured to retrieve one or more models or layers of machine learning models and compile the retrieved objects to generate a new machine learning model or module. For example, the compilation engine 151 is configured to retrieve a convolutional neural network and a recurrent neural network and then compile the convolutional neural network and the recurrent neural network in a parallel architecture to form a new machine learning module (i.e., ParConvRNN 143). In some instances, the convolutional neural network and/or recurrent neural network are pre-trained before being compiled into the new machine learning module. The compilation engine 151 is also configured to retrieve a learnable scalar and compile the learnable scalar into a parallel network along with the convolutional neural network and recurrent neural network. The compilation engine 151 is also able to retrieve one or more additional models which are compatible with the parallel network architecture.

The compilation engine 151 is configured to retrieve an encoder, duration predictor, length regulator, and/or decoder and compile the aforementioned objects sequentially in order to generate an acoustic model (e.g., acoustic model 144). The compilation engine 151 is also configured to retrieve one or more of the new machine learning modules (e.g., ParConvRNN 143) to be included in any of the retrieved objects (e.g., encoder, duration predictor, and/or decoder), as different layers in the encoders, decoders duration predictors, or other models. In some instances, the various objects of the acoustic model 144 are pre-trained before being compiled. Additionally, or alternatively, the acoustic model 144 is trained during and/or after compilation.

The computing system also is configured with a data retrieval engine 152, which is configured to locate and access data sources, databases, and/or storage devices comprising one or more data types from which the data retrieval engine 152 can extract sets or subsets of data to be used as training data (e.g., training data 142) and as input text data (e.g., text data 141). The data retrieval engine 152 receives data from the databases and/or hardware storage devices, wherein the data retrieval engine 152 is configured to reformat or otherwise augment the received data to be used in the text recognition and TTS applications. Additionally, or alternatively, the data retrieval engine 152 is in communication with one or more remote systems (e.g., third-party system(s) 120) comprising third-party datasets and/or data sources. In some instances, these data sources comprise audio-visual services that record or stream text, images, and/or video. The data retrieval engine 152 is configured to retrieve text data 141 in real-time, such that the text data 141 is "streaming" and being processed in real-time (i.e., a user hears the synthesized speech 147 corresponding to the text data 141 at the same rate as the text data 141 is being retrieved and recognized).

The data retrieval engine 152 accesses electronic content comprising text data 141 and/or other types of audio-visual data including video data, image data, holographic data, 3-D image data, etc. The data retrieval engine 152 is a smart engine that is able to learn optimal dataset extraction processes to provide a sufficient amount of data in a timely manner as well as retrieve data that is most applicable to the desired applications for which the machine learning models/engines will be used.

The data retrieval engine 152 locates, selects, and/or stores raw recorded source data wherein the data retrieval engine 152 is in communication with one or more other ML engine(s) and/or models included in computing system 110. In such instances, the other engines in communication with the data retrieval engine 152 are able to receive data that has been retrieved (i.e., extracted, pulled, etc.) from one or more data sources such that the received data is further augmented and/or applied to downstream processes. For example, the data retrieval engine 152 is in communication with the training engine 153 and/or implementation engine 154.

The training engine 153 is configured to train the parallel convolutional recurrent neural networks and/or the individual convolutional neural networks, recurrent neural networks, learnable scalars, or other models included in the parallel convolutional recurrent neural networks. The training engine 153 is configured to train the acoustic model 144 and/or the individual model components (e.g., encoder, decoder, length regulator, duration predictor, etc.). The training engine 153 is configured to train a text analyzer which converts the text data 141 to usable input phones that are applied as input to the encoder of the acoustic model 144. Additionally, the training engine 153 is configured to train the vocoder 146 to process Mel spectrum outputs and generate synthesized speech 147.

The computing system 110 includes an implementation engine 154 in communication with any one of the models and/or ML engine(s) 150 (or all of the models/engines) included in the computing system 110 such that the implementation engine 154 is configured to implement, initiate, or run one or more functions of the plurality of ML engine(s) 150. In one example, the implementation engine 154 is configured to operate the data retrieval engine 152 so that the data retrieval engine 152 retrieves data at the appropriate time to be able to obtain text data for the TTS system 145 to process. The implementation engine 154 facilitates the process communication and timing of communication between one or more of the ML engine(s) 150 and is configured to implement and operate a machine learning model (or one or more of the ML engine(s) 150) which is configured as a TTS system 145 and/or acoustic model 144.

By implementing the disclosed embodiments in this manner, many technical advantages over existing systems are realized, including the ability to generate improved acoustic models and improved TTS systems that produce high quality text-to-speech data. By utilizing a parallel network architecture (e.g., ParConvRNN 143), Overall, disclosed systems improve the efficiency and quality of transmitting linguistical and acoustic meaning through the synthesized speech 147, especially in streaming mode. This improves the user experience by reducing latency, increasing the quality of the speech (i.e., the synthesized speech is clear/understandable and sounds like natural speech).

The computing system is in communication with third-party system(s) 120 comprising one or more processor(s) 122, one or more of the computer-readable instructions 118, and one or more hardware storage device(s) 124. It is anticipated that, in some instances, the third-party system(s) 120 further comprise databases housing data that could be used as training data, for example, text data not included in local storage. Additionally, or alternatively, the third-party system(s) 120 include machine learning systems external to the computing system 110. The third-party system(s) 120 are software programs or applications.

Attention will now be directed to FIG. 2, which illustrates an example embodiment of a process flow diagram for generating synthesized speech. As illustrated, text 202 is applied as input to a TTS system which performs text analysis 204. After the text 202 is analyzed, the text 202 is converted into phones and corresponding linguistic features 206. These phones and corresponding linguistic features 206 are then applied as input to a neural acoustic model 208. The neural acoustic model 208 is configured to process the phones and corresponding linguistic features 206 and generate a Mel spectrum 210 as output. The Mel spectrum 210 is then applied as input to a neural vocoder which is configured to convert the Mel spectrum into audio data 212 comprising synthesized speech utterances based on the text 202 that was initially provided to the TTS system. In some instances, the device neural vocoder comprises a HifiNet Architecture including multi-bands, wherein channels are reduced to 50% of service. The vocoder also comprises a Bi-GRU with fade out which is utilized during the training stage of the vocoder and includes a fade-out to zero during training.

Attention will now be directed to FIG. 3, which illustrates an example embodiment of an acoustic model utilizing one or more parallel convolutional recurrent neural networks in an encoder-decoder architecture. As illustrated, the device acoustic model 300 is shown having an encoder 310, a duration predictor 320, a length regulator 330, and a decoder 340. As shown in FIG. 3, output from the encoder 310 and duration predictor 320 is passed to the length regulator 330 before being processed by the decoder 340.

The encoder 310 is shown having a plurality of machine learning modules that are each configured as parallel convolutional recurrent neural networks ("ParConvRNN"), for example, ParConvRNN 312A, ParConvRNN 312B, ParConvRNN, and 312C. The duration predictor 320 is shown having at least one parallel convolutional recurrent neural network (e.g., ParConvRNN 322A). Additionally, the decoder 340 is shown having a plurality of parallel convolutional recurrent neural networks (e.g., ParConvRNN 342A, ParConvRNN 342B). While the encoder 310 is shown having three ParConvRNN modules, the duration predictor 320 is shown having one ParConvRNN modules, and the decoder 340 is shown having two ParConvRNN modules, it should be appreciated that any of the encoder 310, duration predictor 320, or decoder 340 is configurable with any number of ParConvRNN modules.

Attention will now be directed to FIG. 4, which illustrates an example embodiment of a machine learning module 400 that is configured as a parallel convolutional recurrent neural network (e.g., ParConvRNN 312A, etc.). The machine learning module 400 is shown as including a plurality of one-dimensional convolutional layers, (e.g., convolutional layer 404A, convolutional layer 404B, convolutional layer 404C) and a plurality of gated linear unit layers (GLUs) (e.g., GLU 406A, GLU 406B, and GLU 406C). It should be appreciated that the convolutional neural network is configurable to comprise any number of convolutional layers and/or gate linear unit layers, or other layer compatible with a convolutional neural network. The convolutional neural network is configured to transform features of the input into different spaces, including shared semantic spaces.

Machine learning module 400 is also shown having a recurrent neural network 408, which is configured to receive input 402 in parallel (concurrently) with the input received by the convolutional neural network. The recurrent neural network 408 is configured to model the rhythm of the phonemes efficiently. The recurrent neural network 408 is also configured to be a small recurrent neural network, specifically having a smaller channel size, or smaller feature map size, than many convolutional neural networks, including the convolutional neural network it is paired with. In some instances, the recurrent neural network 408 comprises a channel size of 128 bits, while the channel size for the convolutional neural network is 512 bits.

Because the recurrent neural network is processing input data in parallel with the convolutional neural network, the output from the recurrent neural network will be combined with output from the convolutional neural network, and such that the machine learning module 400 is effectively configured/configurable with a small recurrent neural network, without extending the overall processing pipeline of the TTS processing.

The ability to configure the recurrent neural network in parallel with the convolutional neural network in this manner provides several technical benefits, including a reduction of memory size required for storing the machine learning module, as well as a reduction in the latency time that occurs during processing, particularly when compared to processing input data with conventional recurrent neural networks that are not processing input in parallel.

In particular, the time cost for inference associated with recurrent neural networks is typically higher than time costs associated with convolutional neural networks. Thus, the time cost for inference is beneficially reduced according to many of the disclosed embodiments by providing a module in which a smaller recurrent neural network is usable and processed in parallel with the convolutional neural network, such that the overall length of the processing pipeline is reduced.

Additionally, because of the parallel architecture for processing the convolutional neural network and recurrent neural network, any backpropagation that occurs during training of the machine learning module 400 can be reduced, thus requiring less training data and less time for training on the training data. In contrast, a sequential model (i.e., as described in regard to conventional models) have longer/ deeper pipelines, which require more extensive training because of the added length of backpropagation between the sequential layers. The parallel architecture provides for a machine learning module that requires fewer parameters to learn and configure than conventional sequential modules.

Machine learning module 400 is also shown having a learnable scalar 410 which is configured as a scalar vector by which the input 402 is multiplied. The learnable scalar 410 is configured to be in a parallel architecture, wherein the learnable scalar 410 receives input 402 in parallel with the convolutional neural network and the recurrent neural network 408. The scalar vector is associated with one or more parameters that are learnable based on training data that the machine learning module 400 is trained on. In some instances, the learnable scalar 410 is configured as an escape connection, skip connection, and/or residual connection. The learnable scalar 410 contributes to lower training loss and makes the deep network training more efficient.

In some configurations, the learnable scalar 410 is optional, wherein the machine learning module 400 comprises the one or more convolutional neural network layers and the recurrent neural network 408. Additionally, or alternatively, the machine learning module 400 comprises one or more other machine learning models that replace the learnable scalar 410, or that are in addition to the convolutional neural network and recurrent neural network. Other machine learning models that are configurable in the machine learning module 400 include additional convolutional neural networks, additional recurrent neural networks, long-short-term-memory (LSTM) modes, bi-directional LSTM models, embedding layers (e.g., character embeddings, phoneme embeddings, user-specific voice embeddings, etc.), linear projections, attention-based layers, positional encoding layers, transformers, or other models and/or model layers that are compatible with the parallel architecture of machine learning module 400.

The input 402 is processed by at least the one or more convolutional neural network layers and the recurrent neural network 408, wherein output, as illustrated in FIG. 4, from the final layer of the convolutional neural network (e.g., GLU 406C) is combined with output from the recurrent neural network 408 to generate combined output 412.

Figure 5:
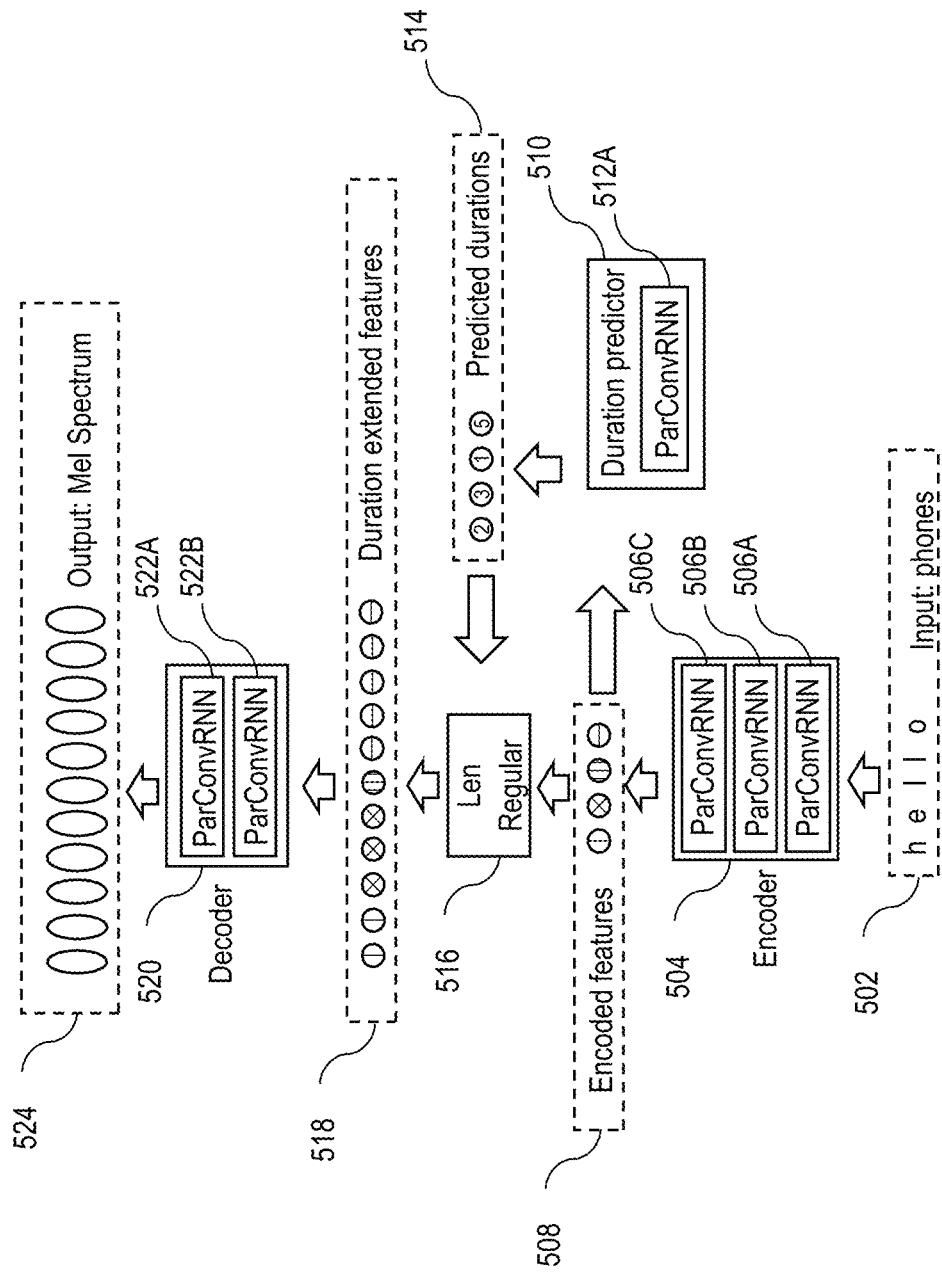
FIG. 5 illustrates an example embodiment of a process flow diagram for generating a Mel spectrum using an acoustic model, for example an acoustic model as shown in FIG. 3.

Attention will now be directed to FIG. 5, which illustrates an example embodiment of a process flow diagram for generating a Mel spectrum using an acoustic model, for example an acoustic model as shown in FIG. 3. The acoustic model is shown having an encoder 504, a duration predictor 510, a length regulator 516, and a decoder 520. The encoder 504 is shown having a plurality of machine learning modules (e.g., ParConvRNN 506A, ParConvRNN 506B, ParConvRNN 506C). The duration predictor 510 is shown having at least one machine learning module (e.g., ParConvRNN 512A). Additionally, the decoder is shown having a plurality of machine learning modules (e.g., ParConvRNN 522A, ParConvRNN 522B)

As illustrated, input 502 comprising phones for the word "hello" is applied to an encoder 504. In some instances, the input phones are generated based on output from text analysis of input text. The encoder 504 is configured to encode the input 502 with encoded features 508 (e.g., acoustic features). In some instances, the encoded features (e.g., hidden features) are configured as speech features which include acoustic features and linguistic features that have been extracted from processing the text data. Acoustic features include audio features such as vowel sounds, consonant sounds, length, and emphasis of individual phonemes, as well as speaking rate, speaking volume, and whether there are pauses in between words. Linguistic features are characteristics used to classify audio data as phonemes and words. Linguistic features also include grammar, syntax, and other features associated with the sequence and meaning of words. These words form speech utterances that are recognized by the TTS system (e.g., TTS system 145).

The duration predictor 510 is configured to output predicted durations of time for each encoded feature includes in the set of encoded features 508. The length regulator 516 is configured to receive the encoded features 508 and the predicted durations 514 corresponding to each encoded feature to generate a set of duration extended features 518. For example, the input phones for the word "hello" produced a set of four distinct encoded features (see encoded features 508). The duration predictor 510 predicted a duration of 2 units for "h", a duration of 3 units for "e", a duration of 1 unit for "l-l" and a duration of 5 units for "o". It should be appreciated that the unit may be any time unit (e.g., seconds, milliseconds, nanoseconds, etc.).

Thus, the set of duration extended features 518 is based on the length regulator applying the predicted durations 514 to the encoded features 508. The length regulator duplicates the encoded features according to the predicted durations 514. The duration extended features 518 are then applied as input to the decoder 520, which is configured to decode the duration extended features and output a Mel spectrum 524, which is a waveform representation of the input 502. The Mel spectrum 524 is readable by a vocoder or other voice synthesizer to produce audible synthesized speech (e.g., an audio file comprising a synthesized speech utterance for "hello").

Figure 6:
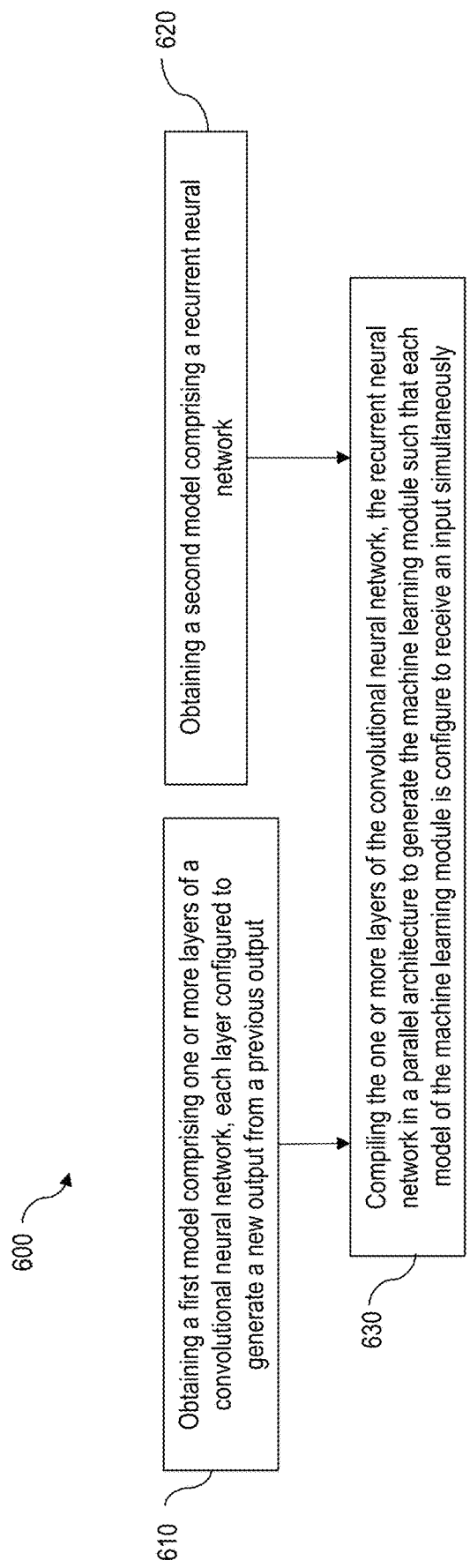
FIG. 6 illustrates one embodiment of a flow diagram having a plurality of acts for generating a machine learning module configured as a parallel convolutional recurrent neural network.

Attention will now be directed to FIG. 6 which illustrates a flow diagram 600 that includes various acts (act 610, act 620, and act 630) associated with exemplary methods that can be implemented by computing system 110 for generating a machine learning module configured as a parallel convolutional neural network.

The first illustrated act includes an act of obtaining a first model comprising one or more layers of a convolutional neural network (act 610). Each layer of the convolutional neural network is configured to generate a new output from a previous input. By including a convolutional neural network, the computing system achieves the technical benefit of being able to transform features associated with the text data into different representational spaces. This helps to facilitate an improved encoding and/or decoding process of hidden features.

The systems also obtain a second model comprising a recurrent neural network (act 620). By including a recurrent neural network, the computing system achieves the technical benefit of being able to model rhythm associated with how the text data should be processed into synthesized speech. Furthermore, the inclusion of a recurrent neural network improves the functioning of the computing system by reducing memory storage needed to store the machine learning module because the recurrent neural network is configured to have a smaller channel size than the convolutional neural network.

Subsequent to obtaining the first model and the second model, the disclosed systems compile the one or more layers of the convolutional neural network and the recurrent neural network in a parallel architecture to generate a new machine learning module such that each model of the machine learning module is configured to receive input simultaneously (act 630). By compiling the first model and the second model in a parallel network architecture, the depth of the machine learning model is reduced (as compared to compiling the first model and second model in a sequential manner). This improves the functioning of the computing system by reducing processing time and inference cost, while achieving an improved output of the machine learning module because the combined output includes information learned from both models.

In some instances, flow diagram 600 includes additional acts associated with the methods implemented by computing system 110. For example, computing system 110 is configured to obtain a third model comprising a learnable scalar and compile the learnable scalar in parallel with the one or more layers of the convolutional neural network and the recurrent neural network. By including a learnable scalar, the computing system achieves the technical benefit of improving the residual signal associated with the data being processed by the machine learning module.

In such instances, each model (e.g., the convolutional neural network, the recurrent neural network, and the learnable scalar) of the machine learning module is configured to receive input simultaneously. Additionally, the output from each model is combinable to generate a final combined output. By combining the outputs from the various models, the combined output is higher quality than either of the individual outputs, such that it includes learned information from each of the sub-components of the machine learning module.

The computing system 110 is also configured to obtaining one or more additional models and compile the one or more additional models in parallel with the one or more layers of the convolutional neural network, the recurrent neural network, and the learnable scalar, such that each model of the machine learning module is configured to receive input simultaneously. The one or more additional models that is obtained is selected from a following of: an LSTM model, a bi-directional LSTM model, a recurrent neural network, a convolutional neural network, or a learnable skip connection. By implementing systems in this manner, the computing system is able to customize the machine learning module by including one or more different models in the parallel network architecture. Thus, the computing system is able to leverage various technical benefits from different models without having to increase the processing time, storage size, or inference cost of the machine learning module.

After the machine learning module is compiled, the computing system 110 is configured to train the machine learning module to generate a combined output based on output from at least the first model and the second model. By combining the outputs from the various models, the combined output is higher quality than either of the individual outputs, such that it includes learned information from each of the sub-components of the machine learning module. Furthermore, by compiling the machine learning module in a parallel network architecture, the training process is improved by reducing training time and reducing training loss between layers of the various models included in the machine learning module.

After the machine learning module is compiled and trained, the computing system 110 is configured to provide the machine learning module to a component of the computing system that is configured to receive a first input and generate a combined output using the machine learning module. The computing system 110 then receives the first input, obtains a first output from the first model based on the first input, obtains a second output from the second model based on the first input, and generates the combined output based on the first output and the second output. In some instances, the combined output is a Mel spectrum configured to be applied as input to a vocoder in order to generate synthesized speech utterances (e.g., text-to-speech data). Implementing systems and methods in this manner beneficially generate high-quality synthesized speech utterances because the Mel spectrum is based on a combined output from various machine learning modules. This improves user experience, especially during streaming text-to-speech applications, because the synthesized speech is more natural, retains more accurate speech utterances that correspond well to the recognized text, and reduces latency in presenting the synthesized speech to the user.

Figure 7:
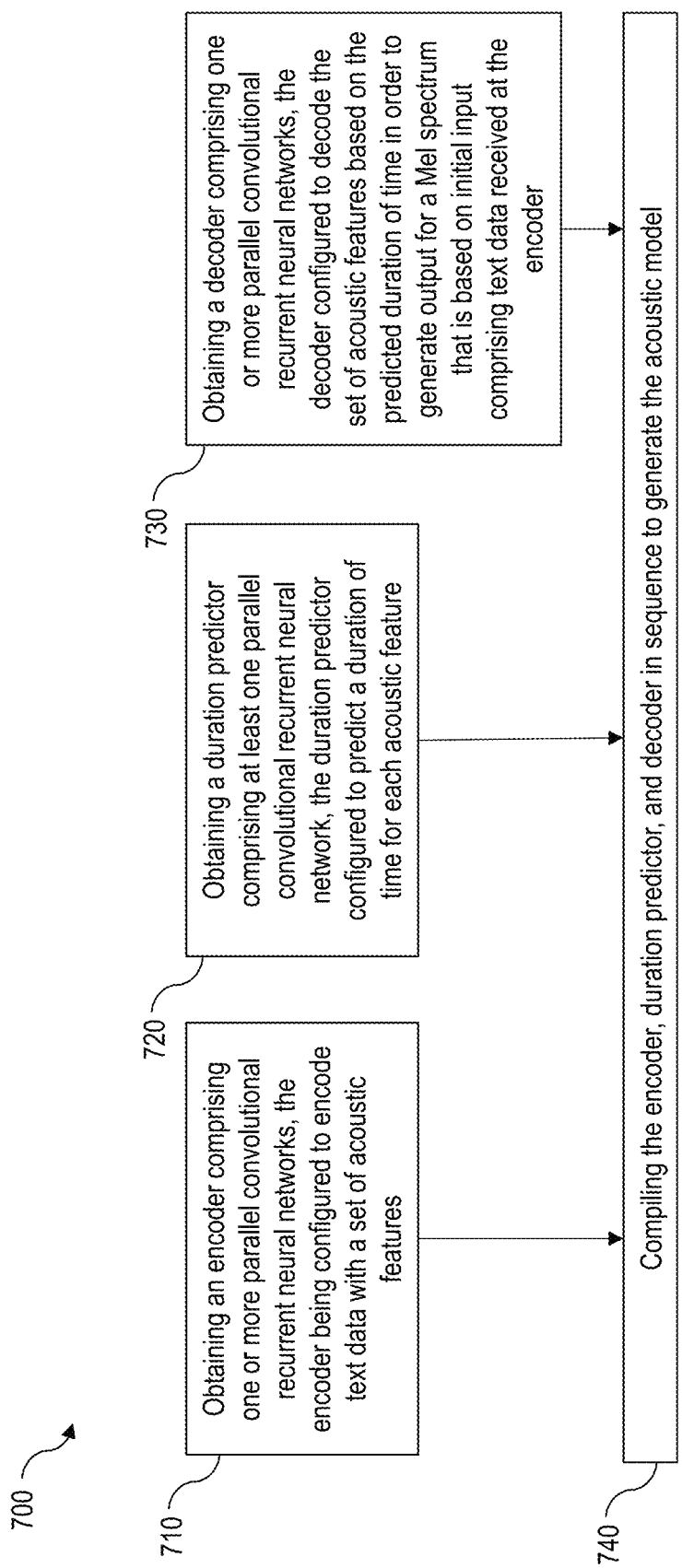
FIG. 7 illustrates another embodiment of a flow diagram having a plurality of acts for generating an acoustic model with one or more parallel convolutional recurrent neural network models.

Attention will now be directed to FIG. 7 which illustrates a flow diagram 700 that includes various acts (act 710, act 720, act 730, and act 740) associated with exemplary methods that can be implemented by computing system 110 for generating an acoustic model comprising one or more machine learning modules configured as a parallel convolutional recurrent neural network.

The first illustrated act includes an act wherein the computing system obtains an encoder comprising one or more parallel convolutional recurrent neural networks (act 710). The encoder is configured to encode text data with a set of acoustic features. Because the encoder includes one or more machine learning modules configured as parallel convolutional recurrent neural networks, the storage size for the encoder is reduced (because of the smaller RNN networks), and the encoder is able to process the input phones more quickly in order to generate the set of encoded features.

The system also obtains a duration predictor comprising at least one parallel convolutional recurrent neural network (act 720). The duration predictor is configured to predict a duration of time for each acoustic feature. Because the duration predictor includes one or more machine learning modules configured as parallel convolutional recurrent neural networks, the storage size for the duration predictor is reduced (because of the smaller RNN networks), and the duration predictor is able to process the encoded features more quickly in order to generate the predicted durations.

The system obtains a decoder comprising one or more parallel convolutional recurrent neural networks (act 730). The decoder is configured to decode the set of acoustic features based on the duration of time associated with each acoustic feature in order to generate output for a Mel spectrum. The Mel spectrum is based on the initial input comprising text data received at the encoder. Because the decoder includes one or more machine learning modules configured as parallel convolutional recurrent neural networks, the storage size for the decoder is reduced (because of the smaller RNN networks), and the decoder is able to process the extended encoded features more quickly in order to generate the Mel spectrum output.

In such systems, each parallel convolutional recurrent neural network included in the encoder, duration predictor, and decoder comprises one or more layers of a convolutional neural network and a recurrent neural network compiled in a parallel architecture. Subsequent to obtaining the encoder, the duration predictor, and decoder, the computing system is configured to compile the encoder, the duration predictor, and decoder in sequence to generate an acoustic model (act 740). Thus, the overall storage size of the acoustic model is reduced. Additionally, because of the smaller RNN networks, inference cost is reduced, and latency times are reduced.

Implementing systems in this manner, as shown in FIG. 7, provide many technical advantages over existing systems, including the ability to generate and implement a lightweight and high-quality TTS system. By combining the convolutional neural network and recurrent neural network in a parallel network structure, the disclosed embodiments are able to utilize parallel sub-networks of in a TTS system to configure the TTS system with different types of models, different sizes of models, and different combinations of models without increasing feature channel size or network (i.e., pipeline) depth.

The parallel network is an efficient architecture, which allows for generating high-quality acoustic models that have a small size and small inference cost. The parallel network architecture also provides a shorter pipeline, which reduces backpropagation during training. This makes training of the machine learning module (i.e., ParConvRNN), the acoustic model, and TTS system more efficient and produces lower training loss, especially during subsequent training of the acoustic model which employs one or more machine learning modules as described herein.

In some instances, flow diagram 700 includes additional acts associated with the methods implemented by computing system 110. For example, computing system 110 is configured to obtain a length regulator configured to regulate a length of each acoustic feature based on output from the duration predictor before applying output from the encoder as input to the decoder.

After the acoustic model is generated, the computing system 110 is configured to provide the acoustic model to a system component of the computing system configured to receive the initial input comprising text data and generate a new output comprising a Mel spectrum associated with the initial input. In some instances, the acoustic model is provided to a system component of a computing system of a mobile device, an automobile media interface, or an IoT device. In this manner, the acoustic model is deployable in a variety of text-to-speech applications, including when receiving streaming text.

Subsequently, the computing system receives the initial input comprising text data at the system component, applies the initial input comprising text data as input to the encoder, obtains a first output from the one or more layers of the convolutional neural network included in the parallel convolutional recurrent neural network of the encoder, obtains a second output from the recurrent neural network included in the parallel convolutional recurrent neural network of the encoder and generates a combined encoder output based on at least the first output and at least the second output, the combined encoder output comprising a set of encoded features. This improves the functioning of the computing system by reducing processing time and inference cost, while achieving an improved output of the machine learning module because the combined output comprising the set of encoded features includes information learned from both models.

After obtaining the set of encoded features, the computing system is configured to apply the combined encoder output to the duration predictor and obtain a predicted duration for each encoded feature included in the set of encoded features. The predicted durations are able to be generated more quickly because of the parallel architecture of the machine learning module included in the duration predictor. Furthermore, the quality of the predicted durations (i.e., the prediction of each time duration is associated with a higher confidence level) is improved because the predicted durations are based on the combined output from the various models compiled in parallel in the machine learning module (i.e., ParConvRNN).

The predicted duration for each encoded feature in the set of encoded features is then applied as input to the decoder, along with the set of encoded features. In this manner, the decoder is able to generate a Mel spectrum output based on set of encoded features and the predicted duration for each encoded feature in the set of encoded features. The Mel spectrum outputs are able to be generated more quickly because of the parallel architecture of the machine learning module(s) included in the decoder. Furthermore, the quality of the Mel spectrum output is improved because the Mel spectrum output are based on the combined output from the various models compiled in parallel in the machine learning module (i.e., ParConvRNN).

After the Mel spectrum output is generated, the computing system is configured to apply the Mel spectrum output to a vocoder to generate an audio file comprising simulated speech utterances (e.g., synthesized speech) based on the Mel spectrum output. The vocoder is configured to generate an audio file, wherein the simulated speech utterances are text-to-speech data based on the initial input comprising text data. As described above, because the Mel spectrum output is an improved Mel spectrum output, the subsequent synthesized speech is also improved when the Mel spectrum output is applied to the vocoder.

In some instances, prior to compiling the machine learning modules used in the various sub-components of the acoustic model, the computing system obtains a learnable scalar configured as a learnable skip connection and compiles the learnable scalar layer in parallel with one or more layers of the convolutional neural network and the recurrent neural network included in one or more of the parallel convolutional recurrent neural network models. By including a learnable scalar, the computing system achieves the technical benefit of improving the residual signal associated with the data being processed by the machine learning module.

Furthermore, in some instances, each recurrent neural network included in the encoder, duration predictor, and decoder comprise an RNN channel size that is less than a channel size associated with the one or more layers of the convolutional neural network. Having a smaller channel size provides the technical benefit of reducing processing time, reducing computer memory needed to store the machine learning module, and thus reduces latency time when the acoustic model processes streaming text data.

Figure 8:
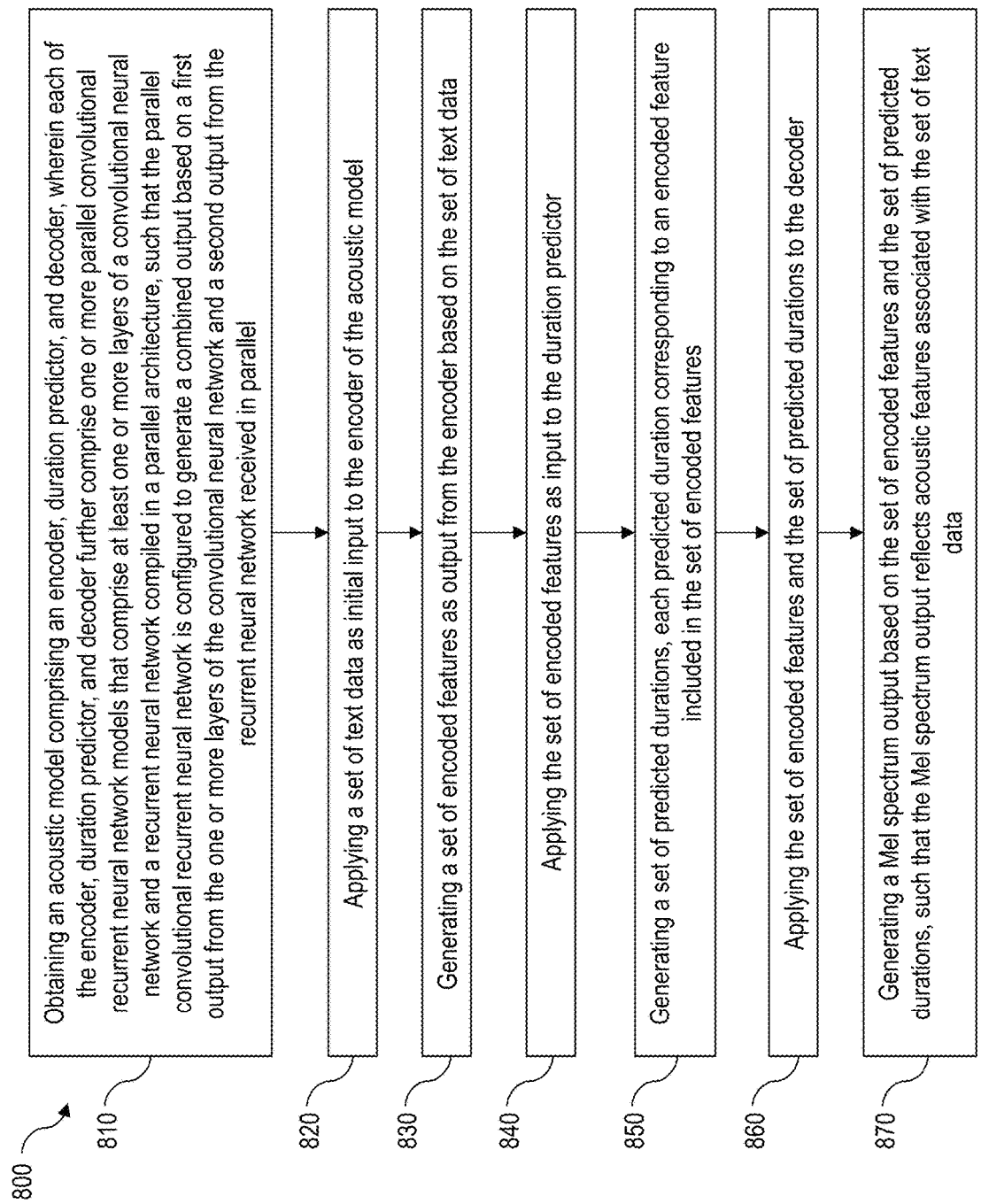
FIG. 8 illustrates one embodiment of a flow diagram having a plurality of acts for generating a Mel spectrum.

Attention will now be directed to FIG. 8 which illustrates a flow diagram 800 that includes various acts (act 810, act 820, act 830, act 840, act 850, act 860, and act 870) associated with exemplary methods that can be implemented by computing system 110 generating a Mel spectrum output based on input text data.

The first illustrated act includes an act where the computing system obtains an acoustic model comprising an encoder, duration predictor, and decoder (act 810). Each of the encoder, duration predictor, and decoder further comprise one or more parallel convolutional recurrent neural network models. Each parallel convolutional recurrent neural network model further comprise at least one or more layers of a convolutional neural network and a recurrent neural network compiled in a parallel architecture, such that the parallel convolutional recurrent neural network is configured to generate a combined output based on a first output from the one or more layers of the convolutional neural network and a second output from the recurrent neural network received in parallel. Because the acoustic model is configured in this manner, the computing system achieves all of the technical benefits achieved associated with the acoustic model, for example the acoustic model described in reference to FIG. 7, including reduced processing time, reduced storage memory, improved output, etc.

Subsequent to obtaining the acoustic model, the systems apply a set of text data as initial input to the encoder of the acoustic model (act 820). In some instances, the set of text data is a continuous stream of text data, such that the computing system is configured to generate an audio file in real-time as streaming audio data comprising synthesized speech (i.e., text-to-speech data). Conventional models typically comprise sequential network architectures which require elongated processing times that reduce the efficiency of processing streaming text data. Thus, the parallel network associated with various sub-components of the acoustic model thus allows the system to process streaming data more efficiently, while retaining quality of output.

After applying the set of text data to the encoder of the acoustic model, the system generates a set of encoded features as output from the encoder based on the set of text data (act 830). By combining the outputs from the various models, the combined output (i.e., the set of encoded features) is higher quality than either of the individual outputs, such that it includes learned information from each of the sub-components of the machine learning module.

The set of encoded features is then applied as input to the duration predictor (act 840), wherein the systems generate a set of predicted durations (act 850). Each predicted duration corresponds to an encoded feature included in the set of encoded features. By combining the outputs from the various models, the combined output (i.e., the set of predicted durations) is higher quality than either of the individual outputs, such that it includes learned information from each/all of the sub-components of the machine learning module.

The computing system then applies the set of encoded features and the set of predicted durations to the decoder (act 860). Finally, the systems generate a Mel spectrum output based on the set of encoded features and the set of predicted durations, such that the Mel spectrum output reflects acoustic features associated with the set of text data (act 870). The Mel spectrum outputs are able to be generated more quickly because of the parallel architecture of the machine learning module(s) included in the decoder. Furthermore, the quality of the Mel spectrum output is improved because the Mel spectrum output are based on the combined output from the various models compiled in parallel in the machine learning module (i.e., ParConvRNN).

As shown in FIG. 8, the disclosed embodiments provide many technical advantages over existing systems. For example, by combining the convolutional neural network and recurrent neural network in a parallel network structure, the disclosed embodiments are able to utilize parallel sub-networks of in a TTS system to configure the TTS system with different types of models, different sizes of models, and different combinations of models without increasing feature channel size or network (i.e., pipeline) depth.

The parallel network is an efficient architecture, which allows for generating high-quality acoustic models that have a small size and small inference cost. The parallel network architecture also provides a shorter pipeline, which reduces backpropagation during training. This makes training of the machine learning module (i.e., ParConvRNN), the acoustic model, and TTS system more efficient and produces lower training loss, especially during subsequent training of the acoustic model which employs one or more machine learning modules as described herein.

In some instances, flow diagram 800 includes additional acts associated with the methods implemented by computing system 110. For example, computing system 110 is configured to apply the Mel spectrum output as input to a vocoder configured to output an audio file comprising simulated speech utterances based on the Mel spectrum output and generate the audio file such that the simulated speech utterances correspond to text utterances included in the set of text data. As described above, because the Mel spectrum output is an improved Mel spectrum output, the subsequent synthesized speech is also improved when the Mel spectrum output is applied to the vocoder.

In view of the foregoing, it will be appreciated that the disclosed embodiments provide many technical benefits over conventional systems and methods for generating a machine learning module configured as a parallel convolutional recurrent neural network, generating an acoustic model utilizing one or more parallel convolutional recurrent neural networks, and for generating a Mel spectrum using an acoustic model configured according to embodiments disclosed herein. The disclosed embodiments provide for improved TTS systems, especially during streaming applications, wherein text is converted to synthesized speech.

Example Computing Systems

Embodiments of the present invention may comprise or utilize a special purpose or general-purpose computer (e.g., computing system 110) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media (e.g., hardware storage device(s) 140 of FIG. 1) that store computer-executable instructions (e.g., computer-readable instructions 118 of FIG. 1) are physical hardware storage media/devices that exclude transmission media. Computer-readable media that carry computer-executable instructions or computer-readable instructions (e.g., computer-readable instructions 118) in one or more carrier waves or signals are transmission media. Thus, by way of example, and not limitation, embodiments of the invention can comprise at least two distinctly different kinds of computer-readable media: physical computer-readable storage media/devices and transmission computer-readable media.

Physical computer-readable storage media/devices are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 130 of FIG. 1) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry, or desired program code means in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for generating a machine learning module that is configured as a parallel convolutional recurrent neural network, the method comprising:

obtaining a first model comprising one or more layers of a convolutional neural network, each layer of the one or more layers of the convolutional neural network being configured to generate a new output from a previous input;

obtaining a second model comprising a recurrent neural network;

compiling the one or more layers of the convolutional neural network with the recurrent neural network into a new machine learning module that is configured as a parallel convolutional recurrent neural network with the first and second models that are compiled into the new machine learning module being configured to receive input simultaneously; and training the new machine learning module to generate a combined output based on output from the first model and second model in parallel.

2. The method of claim 1, further comprising:

obtaining a third model comprising a learnable scalar; and compiling the learnable scalar in parallel with the one or more layers of the convolutional neural network and the recurrent neural network into the new machine learning module, and such that the first, second and third models of the new machine learning module are all configured to receive input simultaneously.

3. The method of claim 2, further comprising:

obtaining one or more additional models; and compiling the one or more additional models in parallel with the one or more layers of the convolutional neural network, the recurrent neural network, and the learnable scalar into the new machine learning module, and such that the first, second, third and one or more additional models of the machine learning module are configured to receive input simultaneously.

4. The method of claim 3, wherein the one or more additional models each comprise at least one of: an LSTM model, a bi-directional LSTM model, a recurrent neural network, a convolutional neural network, or a learnable skip connection.

5. The method of claim 1, further comprising:

providing the new machine learning module to a component of the computing system that is configured to receive a first input and generate a combined output using the machine learning module;

receiving the first input;

obtaining a first output from the first model based on the first input;

obtaining a second output from the second model based on the first input; and generating the combined output based on the first output and the second output.

6. The method of claim 5, wherein the combined output is a Mel spectrum.

7. A method implemented by a computing system for generating an acoustic model configured to output a Mel spectrum based on a text data, the method comprising:

obtaining an encoder comprising one or more parallel convolutional recurrent neural networks, the encoder being configured to encode text data with a set of acoustic features, obtaining a duration predictor comprising at least one parallel convolutional recurrent neural network, the duration predictor configured to predict a duration of time for each acoustic feature;

obtaining a decoder comprising one or more parallel convolutional recurrent neural networks, the decoder configured to decode the set of acoustic features based on the duration of time in order to generate output for a Mel Spectrum that is based on initial input comprising text data received at the encoder, wherein each parallel convolutional recurrent neural network included in the encoder, duration predictor, and decoder comprises one or more layers of a convolutional neural network and a recurrent neural network compiled in a parallel architecture;

compiling the encoder, duration predictor, and decoder in sequence to generate the acoustic model; and obtaining a length regulator configured to regulate a length of each acoustic feature based on output from the duration predictor before applying output from the encoder as input to the decoder.

8. The method of claim 7, further comprising:

providing the acoustic model to a system component of the computing system configured to receive the initial input comprising text data and generate a new output comprising a Mel spectrum associated with the initial input.

9. The method of claim 8, further comprising:

receiving the initial input comprising text data at the system component;

applying the initial input comprising text data as input to the encoder;

obtaining a first output from the one or more layers of the convolutional neural network included in a parallel convolutional recurrent neural network of the encoder;

obtaining a second output from the recurrent neural network included in the parallel convolutional recurrent neural network of the encoder; and generating a combined encoder output based on at least the first output and at least the second output, the combined encoder output comprising a set of encoded features.

10. The method of claim 9, further comprising:

applying the combined encoder output to the duration predictor; and obtaining a predicted duration for each encoded feature included in the set of encoded features.

11. The method of claim 10, further comprising:

applying the predicted duration for each encoded feature in the set of encoded features and the set of encoded features as input to the decoder; and generating a Mel spectrum output from the decoder based on the predicted duration for each encoded feature in the set of encoded features and the set of encoded features.

12. The method of claim 11, further comprising:

applying the Mel spectrum output to a vocoder configured to generate an audio file comprising simulated speech utterances based on the Mel spectrum output; and generating the audio file, wherein the simulated speech utterances are text-to-speech data based on the initial input comprising text data.

13. The method of claim 7, further comprising:

obtaining a learnable scalar layer configured as a learnable skip connection; and compiling the learnable scalar layer in parallel with the one or more layers of the convolutional neural network and the recurrent neural network included in the one or more parallel convolutional recurrent neural networks.

14. The method of claim 8, wherein the acoustic model is provided to the system component of the computing system of a mobile device, an automobile media interface, or an IoT device.

15. The method of claim 7, wherein each recurrent neural network (RNN) included in the encoder, duration predictor, and decoder comprise an RNN channel size less than a channel size associated with the one or more layers of the convolutional neural network.

16. A method implemented by a computing system for generating a Mel spectrum output based on input text data, the method comprising:

obtaining an acoustic model comprising an encoder, duration predictor, length regulator, and decoder, wherein each of the encoder, duration predictor, and decoder further comprise one or more parallel convolutional recurrent neural network models that comprise at least one or more layers of a convolutional neural network and a recurrent neural network compiled in a parallel architecture, such that the one or more parallel convolutional recurrent neural network models is configured to generate a combined output based on a first output from the at least one or more layers of the convolutional neural network and a second output from the recurrent neural network, the first and second outputs being received in parallel;

applying a set of text data as initial input to the encoder of the acoustic model;

generating a set of encoded features as output from the encoder based on the set of text data;

applying the set of encoded features as input to the duration predictor;

generating a set of predicted durations, each predicted duration corresponding to an encoded feature included in the set of encoded features;

applying the set of encoded features and the set of predicted durations to the length regulator;

generating a set of duration extended features based on the length regulator applying the predicted durations to the encoded features;

applying the duration extended features to the decoder; and generating a Mel spectrum output based on the set of duration extended feature, such that the Mel spectrum output reflects acoustic features associated with the set of text data.

17. The method of claim 16, further comprising:

applying the Mel spectrum output as input to a vocoder configured to output an audio file comprising simulated speech utterances based on the Mel spectrum output; and generating the audio file such that the simulated speech utterances correspond to text utterances included in the set of text data.

18. The method of claim 16, wherein the set of text data is a continuous stream of text data, such that computing system generates an audio file in real-time as streaming audio data.

* * * * *